Figure 1:
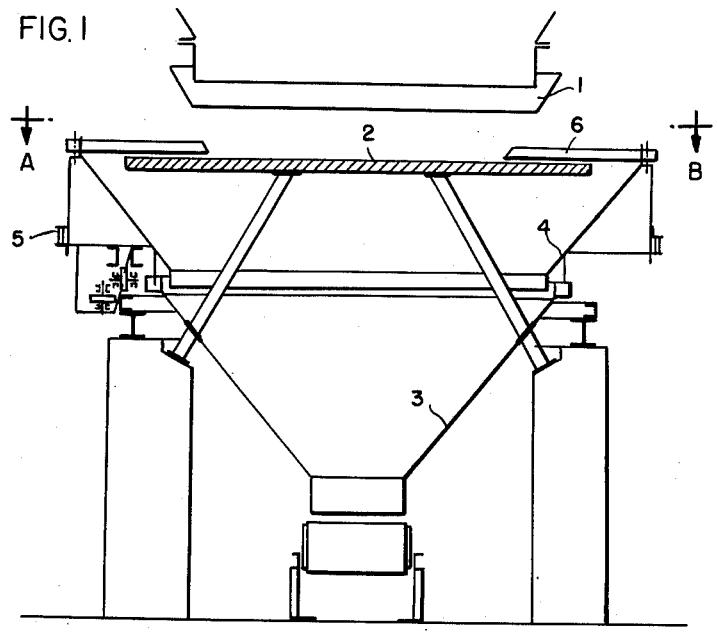

Jan. 30, 1962 G. HAMPRECHT ET AL 3,018,930
DELIVERY APPARATUS FOR LUMPY GOODS
Filed July 30, 1958

INVENTORS:
GUENTHER HAMPRECHT
HEINRICH BELLMUTH
FRIEDRICH LORENZ

ATT'YS

United States Patent Office 3,018,930
Patented Jan. 30, 1962

3,018,930
DELIVERY APPARATUS FOR LUMPY GOODS
Guenther Hamprecht, Limburgerhof, Pfalz, Heinrich Bellmuth, Bad Durkheim, and Friedrich Lorenz, Ludwigshafen (Rhine), Germany, assignors to Badische Anilin- & Soda-Fabrik Aktiengesellschaft, Ludwigshafen (Rhine), Germany
Filed July 30, 1958, Ser. No. 752,129
Claims priority, application Germany Aug. 2, 1957
5 Claims. (Cl. 222—410)

This invention relates to an apparatus for delivering lumpy or pieced material from a receptacle, such as a container for storing the material or a vessel for the treatment of the material.

For the uniform delivery of bulk goods from storage containers it has been proposed to arrange in the lower part of the container a saddle-like inserted member suspended by means of links at the side faces, which by the backward and forward movement of the side faces supplies the bulk goods to a rotating scavenger. According to another known proposal a conical rotating chute surface is arranged within the delivery portion of the storage container and beneath this there are provided helical catchers which by their rotation move the bulk goods inwardly to an outlet opening arranged centrally.

These apparatus have the disadvantage that by the shearing movement of the layer of bulk goods lying under pressure on the support, considerable wear on the support and scavenger and an undesirable attrition of the bulk goods takes place. Emptying means for cylindrical containers here therefore been proposed in which beneath the outlet opening there is provided a conical displacement member with a circular slanting plate, whereby the material leaving the container is pushed over the circumference of the plate into an annular channel from which it is led to an outlet opening by a revolving scraper.

We have found that the delivery of lumpy or pieced materials from containers in which they are stored or from apparatus in which they are treated, for example, the delivery of coarse-pieced coke from a shaft drier serving for the drying of this material, can be effected very suitably with an apparatus in which in known manner a stationary plate of larger diameter than the outlet opening of the container or apparatus is arranged beneath the outlet opening and also one or more stripper bars moving at a short distance above the plate, wherein a bunker is provided beneath the outlet opening, said bunker widening conically upwards, reaching up to the height of the plate and having an opening angle extending beyond the plate diameter, and wherein the bunker, or preferably only the upper part of the same, is arranged to rotate about its axis, and wherein the stripper or strippers are secured to the upper part of the bunker.

By the arrangement according to this invention, the material stripped off from the outer edge of the plate always strikes the same places on the bunker wall, i.e. where the strippers are situated. At these small places which are exposed to strong wear, the bunker wall can readily be reinforced by exchangeable plates. For this reason, only minor expenditures for replacements are ever needed.

It is preferable to provide for adjustment of the strippers in their position relatively to the mid point of the plate so that the amount of material delivered can be varied accordingly.

Figure 2:
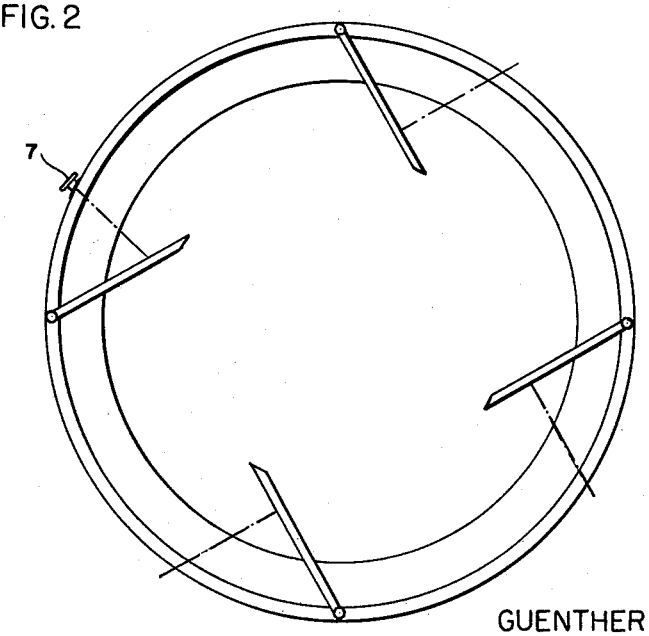

A delivery apparatus according to this invention is shown diagrammatically in the accompanying drawings by way of example. FIGURE 1 is an elevation of the apparatus and FIGURE 2 is a section taken on the line A—B of FIGURE 1.

The material passes from the outlet 1 of a shaft drier on to a stationary plate 2 from which it is moved into a bunker 3 by strippers 6 which are secured to the upper part 4 of the bunker 3, when the part 4 rotates about its axis. Rotation of the bunker part 4 is brought about by means of a toothed crown 5 arranged at its circumference. Displacement of the strippers in position with respect to the mid point of the plate may be effected by means of hand wheels 7 (FIGURE 2).

The stationary plate can be constructed as a flat surface. This has the advantage that it is easy to apply a protective coating, for example of fused basalt. Since a conical heap of material forms on the plate during operation of the shaft drier, and this takes no part in the lateral spill-over, it may be preferable, however, to provide a cone on the flat face of the plate or to make the plate of conical shape.

We claim:
1. Apparatus for delivering lumpy goods from a receptacle having an outlet opening in its lower portion which comprises: a stationary surface member of greater diameter than the diameter of the outlet opening arranged beneath and at a distance from said outlet opening; a conically shaped bunker capable of being rotated about its axis arranged beneath the outlet opening of said receptacle, the upper part of said bunker widening upwards at an angle sufficient to provide an opening at about the level of said surface member greater than the diameter of said surface member; and at least one stripper bar attached to said bunker and arranged immediately above said surface member.

2. Apparatus for delivering lumpy goods from a receptacle having an outlet opening in its lower portion which comprises: a stationary surface member of greater diameter than the diameter of the outlet opening arranged beneath and at a distance from said outlet opening; means to support said surface member and to maintain said surface member in a fixed position; a conically shaped two-sectioned bunker arranged beneath the outlet opening of said receptacle, the upper section of said bunker being capable of rotation about its axis, said upper section of the bunker widening upwards at an angle sufficient to provide an opening at about the level of said surface member greater than the diameter of said surface member; and at least on stripper bar attached to the upper section of said bunker and arranged immediately above said surface member.

3. An apparatus as described in claim 2 wherein the stationary surface member is in the form of a substantially flat plate.

4. An apparatus as described in claim 1 wherein the stripper bar is movably attached to said bunker whereby the position of said bar can be adjusted relative to the midpoint of the plate.

5. An apparatus as described in claim 2 wherein the stripper bar is movably attached to said bunker whereby the position of said bar can be adjusted relative to the midpoint of the plate.

References Cited in the file of this patent

UNITED STATES PATENTS

| | | |
|---|---|---|
| 1,390,271 | Booth | Sept. 13, 1921 |
| 1,960,522 | Alexovits | May 29, 1934 |
| 2,547,868 | Judson | Apr. 3, 1951 |
| 2,574,231 | Sinden | Nov. 6, 1951 |
| 2,767,884 | Gross | Oct. 23, 1956 |
| 2,775,371 | Isserlis | Dec. 25, 1956 |

FOREIGN PATENTS

| | | |
|---|---|---|
| 737,856 | Germany | July 26, 1951 |